(12) United States Patent
Nishina et al.

(10) Patent No.: US 8,033,096 B2
(45) Date of Patent: Oct. 11, 2011

(54) EXHAUST GAS PURIFYING APPARATUS FOR ENGINE

(75) Inventors: Mitsuhiro Nishina, Ageo (JP); Hideki Matsunaga, Ageo (JP)

(73) Assignee: Nissan Diesel Motor Co., Ltd., Saitama (JP)

(*) Notice: Subject to any disclaimer, the term of this patent is extended or adjusted under 35 U.S.C. 154(b) by 923 days.

(21) Appl. No.: 11/952,397

(22) Filed: Dec. 7, 2007

(65) Prior Publication Data

US 2008/0087009 A1    Apr. 17, 2008

Related U.S. Application Data

(63) Continuation of application No. PCT/JP2006/311626, filed on Jun. 9, 2006.

(30) Foreign Application Priority Data

Jun. 10, 2005 (JP) ................. 2005-171147

(51) Int. Cl.
*F01N 3/00* (2006.01)

(52) U.S. Cl. ............ 60/277; 60/286; 60/295; 60/301; 60/303

(58) Field of Classification Search .......... 60/276, 60/277, 286, 295, 300, 301, 303
See application file for complete search history.

(56) References Cited

U.S. PATENT DOCUMENTS

| | | | |
|---|---|---|---|
| 6,063,350 A | 5/2000 | Tarabulski et al. | |
| 6,119,448 A | 9/2000 | Emmerling et al. | |
| 6,519,935 B2 | 2/2003 | Weigl et al. | |
| 7,017,335 B2 | 3/2006 | Huber et al. | |
| 7,065,958 B2 | 6/2006 | Funk et al. | |
| 7,181,337 B2 | 2/2007 | Kosaka | |
| 2004/0045284 A1 | 3/2004 | Ripper et al. | |
| 2004/0251919 A1 | 12/2004 | Stahlmann et al. | |
| 2007/0079599 A1 | 4/2007 | Osaku et al. | |
| 2007/0204677 A1 | 9/2007 | Nishina et al. | |
| 2007/0209428 A1 | 9/2007 | Nishina et al. | |

FOREIGN PATENT DOCUMENTS

| | | |
|---|---|---|
| DE | 10156714 | 6/2002 |
| EP | 1 538 437 | 6/2005 |
| JP | 04-282433 | 10/1992 |
| JP | 05-222923 | 8/1993 |
| JP | 09-096212 | 4/1997 |
| JP | 11-270329 | 10/1999 |
| JP | 2000-027627 | 1/2000 |
| JP | 2001-020724 | 1/2001 |
| JP | 2002-508466 | 3/2002 |
| JP | 2002-155732 | 5/2002 |
| JP | 2002-513109 | 5/2002 |
| JP | 2002-527660 | 8/2002 |
| JP | 2002-370016 | 12/2002 |

(Continued)

*Primary Examiner* — Thomas Denion
*Assistant Examiner* — Diem Tran
(74) *Attorney, Agent, or Firm* — McDermott Will & Emery, LLP

(57) ABSTRACT

A temperature-sensitive type urea sensor 74 is adopted for use in an engine exhaust gas purifying apparatus. The magnitude of convection of urea aqueous solution generated in a storage tank 41 is determined based on temperature information detected by the urea sensor 74. For detection of abnormality, a detected concentration Dn is adopted when the percentage GRDt of temperature change of urea aqueous solution is small, so that convection is small and it is determined not to affect accurate detection of an abnormality.

19 Claims, 9 Drawing Sheets

FOREIGN PATENT DOCUMENTS

| | | |
|---|---|---|
| JP | 2003-269145 | 9/2003 |
| JP | 2003-328744 | 11/2003 |
| JP | 2004-510151 | 4/2004 |
| JP | 2004-517336 | 6/2004 |
| JP | 2004-194028 | 7/2004 |
| JP | 2005-030888 | 2/2005 |
| JP | 2005-083223 | 3/2005 |
| JP | 2005-127262 | 5/2005 |
| JP | 2005-133541 * | 5/2005 |
| JP | 2005-133695 | 5/2005 |
| WO | WO 99/30810 | 6/1999 |
| WO | WO 99/55445 | 11/1999 |
| WO | WO 00/21881 | 4/2000 |
| WO | WO 02/27280 | 4/2002 |
| WO | WO 02/057603 | 7/2002 |
| WO | WO 03/018177 | 3/2003 |
| WO | WO 2005/024194 | 3/2005 |
| WO | WO 2005/040567 | 5/2005 |
| WO | WO 2005/042936 | 5/2005 |

* cited by examiner

EXHAUST GAS PURIFYING APPARATUS FOR ENGINE

This application is a continuation of PCT/JP2006/311626, filed on Jun. 9, 2006.

BACKGROUND OF THE INVENTION

1. Field of the Invention

The present invention relates to an exhaust gas purifying apparatus for an engine, and more specifically to a technology for purifying nitrogen oxide discharged from an engine using ammonia as a reducing agent.

2. Description of the Related Art

As an apparatus for purifying air pollutant discharged from an engine, particularly, nitrogen oxide (hereinafter referred to as "NOx") in the exhaust gas, by post treatment, a following SCR (Selective Catalytic Reduction) unit has been known. That is, a device for injecting ammonia or its precursor aqueous solution into an exhaust gas passage of the engine and with the injected ammonia used as a reducing agent, NOx and this ammonia are allowed to react with each other on a catalyst so as to reduce and purify NOx. Further, there has been also known an SCR unit in which, considering easiness of storage of ammonia on a vehicle, urea as a precursor of the ammonia is stored in a tank in the state of aqueous solution, and urea aqueous solution supplied from this tank is injected into the exhaust gas passage so as to generate ammonia by hydrolysis of urea using exhaust heat (Japanese Laid-Open (Kokai) Patent Application Publication No, 2000-027627 (paragraph number 0013)).

The inventor of the present patent application has contrived adopting of this SCR unit to the exhaust gas purifying apparatus of a vehicular engine and has already succeeded in actual application. It is important to provide a urea sensor in a tank capable of storing therein the urea aqueous solution (hereinafter, referred to as urea aqueous solution tank), in order to perform reduction action of NOx favorably by injecting an appropriate amount of urea aqueous solution to NOx discharge amount from the engine, and reflect an actual concentration of urea (hereinafter when just "concentration" is mentioned, the concentration of urea shall be referred to) on control operation of the engine and the SCR unit. Currently, as a urea sensor, there has been developed a type in which a heater and a temperature measuring resistor are equipped with and an actual concentration is determined based on an electric resistance value obtained by the temperature measuring resistor heated by the heater, by paying attention to the heat transmission characteristic of urea aqueous solution depending on the concentration (Japanese Laid-Open (Kokai) Patent Application No. 2005-030888 (paragraph number 0044)). This inventor has disclosed an exhaust gas purifying apparatus for an engine which adopts a temperature-sensitive type urea sensor in Japanese Patent Application No. 2003-366737 (Japanese Laid-Open (Kokai) Patent Application Publication No. 2005-133541). According to this apparatus, when the concentration detected by a urea sensor is lower than the normal range of concentration, it is estimated that water or other aqueous solution than urea aqueous solution of a predetermined concentration is stored in the urea aqueous solution tank, and then a further detection is performed to become aware of an abnormality about the concentration and some measures such as stopping of injection of urea aqueous solution is resultantly taken.

Here, concerning the exhaust gas purifying apparatus for the engine adopting the temperature-sensitive urea sensor, following problems are encountered. In such an apparatus that a tank stores a urea in the state of aqueous solution, a tank heater is provided in order to prevent urea aqueous solution from being frozen within the urea aqueous solution tank or unfreeze the frozen urea aqueous solution quickly, particularly, on an assumption that the apparatus is used in a cold district (Japanese Laid-Open (Kokai) Patent Application Publication No. 2004-194028). When a temperature-sensitive type urea sensor is adopted, convection flow of the urea aqueous solution is generated within the urea aqueous solution tank accompanied by heating of this tank heater, thereby adversely affecting detection of the concentration performed by the urea sensor. Due to unevenness in temperature of the urea aqueous solution caused by this convection flow, the concentration detected by the urea sensor is dispersed, so that detection accuracy of the concentration might drop, thereby causing errors in detection of an abnormality with the detected concentration used as basic information.

Accordingly, upon adopting the temperature-sensitive type concentration sensor, it is demanded to have a capability of avoiding erroneous detection of abnormality originating from convection of aqueous solution in a storage tank and prevent malfunction of the exhaust gas purifying apparatus, such as unexpected stopping of addition of a reducing agent.

SUMMARY OF THE INVENTION

The present invention was made in view of the above-described problems and is configured to adopt the concentration positively when the temperature of aqueous solution such as urea aqueous solution is maintained in an equilibrium state.

The exhaust gas purifying apparatus for the engine of the present invention reduces NOx in an exhaust gas from an engine by adding a reducing agent for NOx to the exhaust gas and includes: a storage tank for storing the reducing agent for NOx or a precursor thereof to be added to the exhaust gas in the state of aqueous solution; a concentration detecting unit for detecting the concentration of the reducing agent or the precursor contained in the aqueous solution stored in the storage tank; and a control unit which detects a predetermined abnormality concerning the aqueous solution based on the concentration detected by the concentration detecting unit. The concentration detecting unit has a property such that an electric characteristic value thereof changes depending on the temperature and is configured to include therein a first temperature sensing body arranged to be in direct or indirect contact with the aqueous solution and a heater thermally connected to the first temperature sensing body. The concentration detecting unit drives the heater and outputs an electric characteristic value obtained by the first temperature sensing body heated by the heater as the concentration of the reducing agent or its precursor. The control unit determines whether or not the temperature of the aqueous solution is substantially in an equilibrium state and adopts, as basic information for detecting abnormality, the concentration detected at a time period of temperature equilibrium during which it is determined that the temperature of the aqueous solution is in the equilibrium state.

In accordance with the present invention, the exhaust gas purifying apparatus is provided with a configuration such that determination is made as to whether or not the temperature of aqueous solution such as urea aqueous solution is substantially in an equilibrium state and the concentration obtained at the time of determination of the equilibrium state of the urea aqueous solution is adopted as basic information for detecting an abnormality. Consequently, erroneous detection of an abnormality originating from convection can be avoided to reflect a result of accurate abnormality detection in the operation of the exhaust gas purifying apparatus.

Other objects and features of the present invention will be understood from the following description with reference to the accompanying drawings.

The content of Japanese Patent Application No. 2005-171147, which is a foundation for declaration of priority, is incorporated herein as part of this application by reference.

DESCRIPTION OF THE PREFERRED EMBODIMENTS

Hereinafter, a description of an embodiment of the present invention will be provided hereinbelow with reference to the accompanying drawings.

Figure 1:
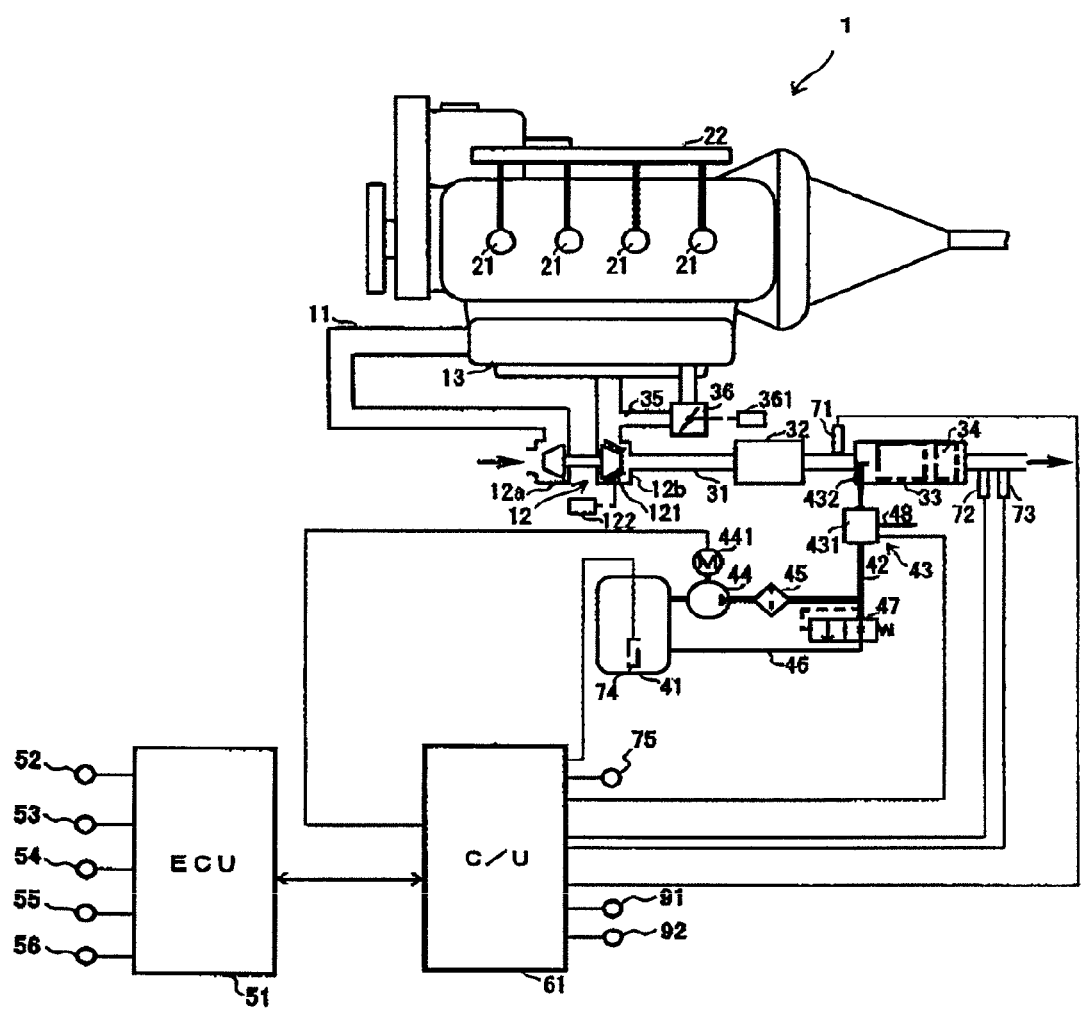
FIG. 1 shows the structure of an engine according to an embodiment of the present invention.

FIG. 1 shows the structure of an automobile engine (hereinafter referred to as "engine") 1 according to an embodiment of the present invention. This embodiment adopts a direct fuel-injection diesel engine as the engine 1.

An air cleaner (not shown) is provided on the introducing portion of a suction air passage 11 so as to deprive dust of suction air with this air cleaner. A compressor 12a of a variable nozzle type turbo charger 12 is provided in the suction air passage 11, and suction air is compressed by the compressor 12a to be delivered therefrom. The compressed suction air then flows into a surge tank 13 and is distributed to each cylinder through a manifold portion.

In an engine main body, its cylinder head is provided with injectors 21 at each cylinder. The injector 21 is operated according to a signal from an engine control unit (hereinafter referred to as "engine C/U") 51. Fuel delivered from a fuel pump (not shown) is supplied to the injector 21 through a common rail 22 and injected into a combustion chamber from the injector 21.

A turbine 12b of the turbo charger 12 is provided in the downstream of a manifold portion in the exhaust gas passage 31. When the turbine 12b is driven by exhaust gas, the compressor 12a is rotated. A movable vane 121 of the turbine 12b is connected to an actuator 122 and its angle is controlled by the actuator 122.

Oxidation catalyst 32, NOx purifying catalyst 33 and ammonia catalyst 34 are disposed in the downstream of the turbine 12b in this order from the upstream side. The oxidation catalyst 32 oxidizes carbon hydride and carbon monoxide in exhaust gas and converts nitric monoxide (hereinafter referred to as "NO") in the exhaust gas to NOx mainly composed of nitrogen dioxide (hereinafter referred to as "$NO_2$"), exerting an operation of adjusting a ratio between NO and $NO_2$ contained in the exhaust gas to be suitable for reduction reaction of NOx described later. The NOx purifying catalyst 33 purifies NOx by reducing NOx. According to this embodiment, to reduce NOx, ammonia is added to exhaust gas as a reducing agent in the upstream of the NOx purifying catalyst 33. In the present embodiment, considering easiness of storage of ammonia, urea which is a precursor of ammonia is stored in a state of aqueous solution. By storing ammonia in the form of urea, the safety is secured.

A urea aqueous solution supply pipe 42 is connected to a storage tank 41 which stores urea aqueous solution and a urea aqueous solution injection nozzle 43 is mounted at the front end of this urea aqueous solution supply pipe 42. A feed pump 44 and a filter 45 are provided on the urea aqueous solution supply pipe 42 in this order from the upstream. The feed pump 44 is driven by an electric motor 441. The electric motor 441 is controlled in terms of its revolution number by a signal from an SCR control unit (hereinafter referred to as "SCR-C/U") 61 so as to adjust the amount of injection of the feed pump 44. A urea aqueous solution return pipe 46 is connected to the urea aqueous solution supply pipe 42 in the downstream of the filter 45. A pressure control valve 47 is provided on the urea aqueous solution return pipe 46 and constructed so that excessive urea aqueous solution of an amount exceeding a specified pressure is returned to the storage tank 41.

The injection nozzle 43 is an air assist type injection nozzle, which is constituted of a main body 431 and a nozzle portion 432. While the urea aqueous solution supply pipe 42 is connected to the main body 431, an air supply pipe 48 for supplying air for assist is also connected thereto. The air supply pipe 48 is connected to an air tank not shown, from which an assist-purpose air is supplied. The nozzle portion 432 is provided such that it penetrates the side face of a casing for the NOx purifying catalyst 33 and the ammonia catalyst 34 in the upstream of the NOx purifying catalyst 33. An injection direction of the nozzle portion 432 is set in parallel to a flow of exhaust gas such that it is directed to the end face of the NOx purifying catalyst 33.

After urea aqueous solution is injected, urea in the injected urea aqueous solution is hydrolyzed by exhaust gas heat so as to produce ammonia. The generated ammonia acts as a reducing agent for NOx on the NOx purifying catalyst 33 so as to reduce NOx. The ammonia catalyst 34 is for purifying slip ammonia having passed the NOx purifying catalyst 33 without contributing to reduction of NOx. It is not preferable to discharge ammonia in a non-purified condition because of its irritating odor. Oxidation reaction of NO by the oxidation catalyst 32, hydrolysis reaction of urea, reduction reaction of NOx with the NOx purifying catalyst 33 and oxidation reaction of slip ammonia in the ammonia catalyst 34 are expressed by the following equations (1) through (4), respectively. In the meantime, according to this embodiment, although the NOx purifying catalyst 33 and the ammonia catalyst 34 are contained in an integral casing, it is permissible to construct respective casings separately.

$$NO + 1/2 O_2 \rightarrow NO_2 \tag{1}$$

$$(NH_2)_2CO + H_2O \rightarrow 2NH_3 + CO_2 \tag{2}$$

$$NO + NO_2 + 2NH_3 \rightarrow 2N_2 + 3H_2O \tag{3}$$

$$4NH_3 + 3O_2 \rightarrow 2N_2 + 6H_2O \tag{4}$$

The exhaust gas passage 31 is fluidly connected to the suction air passage 11 via an EGR tube 35. The EGR tube 35 is provided with an EGR valve 36. The EGR valve 36 is connected to the actuator 361 and the degree of opening thereof is controlled by the actuator 361.

A temperature sensor 71 is provided between the oxidation catalyst 32 and the NOx purifying catalyst 33 in the exhaust gas passage 31 for detecting the temperature of exhaust gas before urea aqueous solution is added. A temperature sensor 72 for detecting the temperature of exhaust gas after reduction and a NOx sensor 73 for detecting the concentration of NOx contained in the exhaust gas after reduction are provided downstream of the ammonia catalyst 34, respectively. A urea sensor 74 for detecting the concentration of urea contained in urea aqueous solution and a temperature sensor 75 for detecting the temperature of urea aqueous solution are provided in the storage tank 41, respectively. In the meantime, the urea sensor 74 constitutes a "concentration detecting unit" of this embodiment.

Detection signals from the temperature sensors 71, 72, the NOx sensor 73, the urea sensor 74 and the temperature sensor 75 are outputted to the SCR-C/U 61. The SCR-C/U 61 calculates and sets an optimum urea aqueous solution injection quantity according to the inputted signals and outputs an instruction or command signal corresponding to the set urea aqueous solution injection quantity to the injection nozzle 43. The SCR-C/U 61 outputs an operation signal to a concentration alarm lamp 91 and a remaining amount alarm lamp 92 provided on a control panel of a driver's seat. Further, the SCR-C/U 61 is connected to an engine C/U 51 to be capable of conducting bi-directional communication therebetween, so that a detected urea concentration is outputted from the SCR-C/U 61 to the engine C/U 51. On the other hand, an ignition switch 52, a start switch 53, a crank angle sensor 54, a vehicle velocity sensor 55, an acceleration sensor 56 and the like are provided on the engine 1 side and thus, these detection signals are inputted to the engine C/U 51. The engine C/U 51 executes calculation of an engine revolution number Ne based on a signal inputted from the crank angle sensor 54. The engine C/U 51 outputs information necessary for injection control of urea aqueous solution such as fuel injection amount to the SCR-C/U 61. In the meantime, the SCR-C/U 61 constitutes a "control unit" of this embodiment of the present invention.

Figure 2:
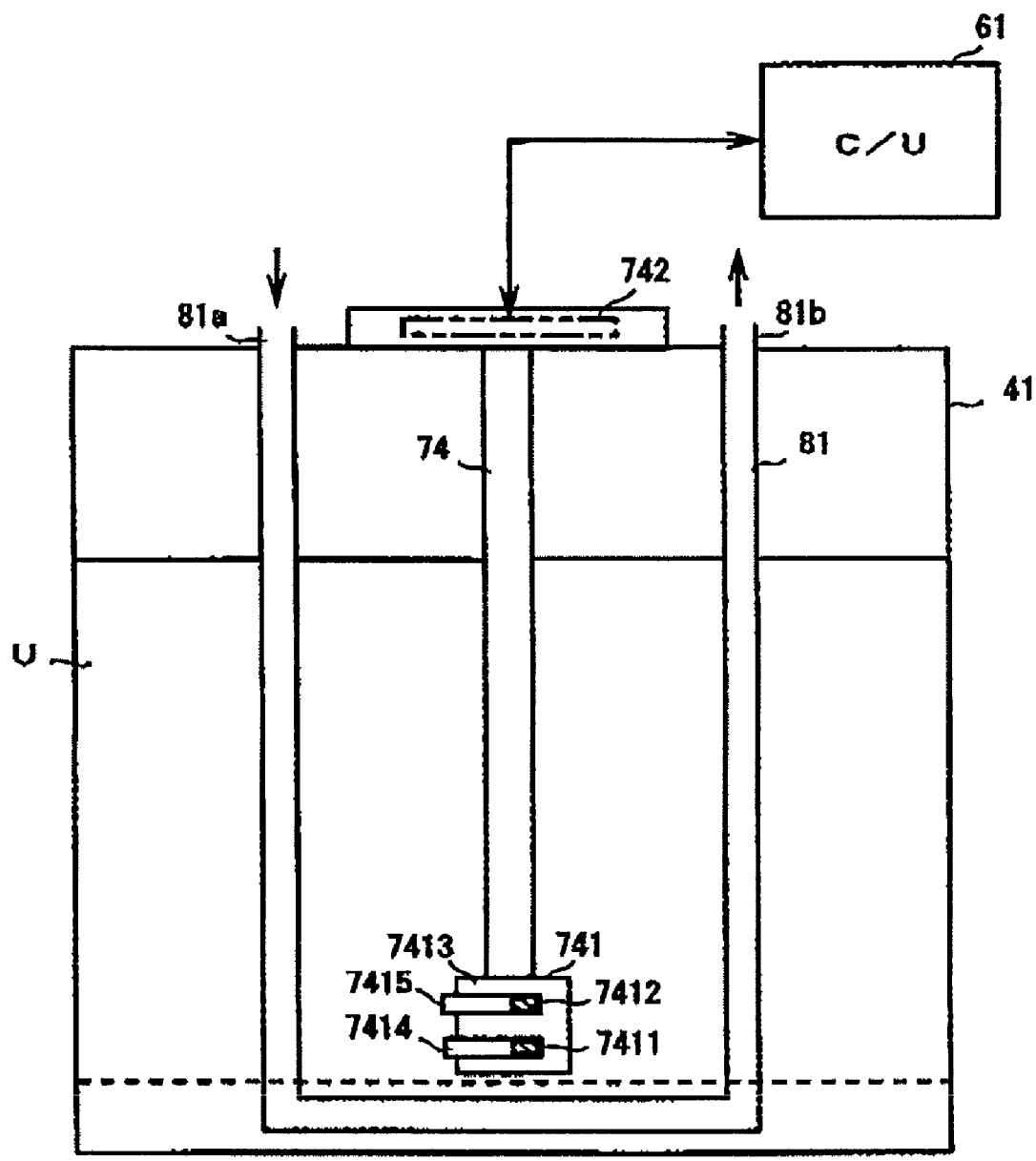
FIG. 2 shows the structure of a urea sensor.

FIG. 2 shows the structure of the urea sensor 74 and a relationship between the urea sensor 74 and a tank heater.

According to this embodiment, the tank heater is constructed to contain a cooling water distribution pipe 81 which distributes cooling water of the engine 1. The cooling water distribution pipe 81 is bent in a U-shape and passes through the ceiling portion of the storage tank 41 at an inlet portion 81a and an outlet portion 81b. Cooling water of the engine 1 after warm up of the engine is introduced into the cooling water distribution pipe 81 and the urea aqueous solution is heated with this cooling water used as heat medium. The urea sensor 74 is provided in the vicinity of the bottom portion of this U-shaped portion and surrounded by the cooling water distribution pipe 81 from three directions, namely, down, left and right (or front and rear).

The urea sensor 74 has the same configuration as a flow rate/liquid type meter described in the above-described Japanese Laid-Open (Kokai) Patent Application Publication No. 2005-030888 and detects the concentration of urea based on electric characteristic values of two temperature sensing bodies.

The flow rate/liquid type meter described in the above-described publication (paragraph numbers 0104-0107) includes a first sensor device having a heater function and a second sensor device having no heater function. The first sensor device includes a heater layer and a temperature measuring resistive layer (hereinafter referred to as "first temperature measuring resistive layer") as a temperature sensing body formed on the heater layer in an insulated state. Although the latter second sensor device includes the temperature measuring resistor body (hereinafter referred to as "second temperature measuring resistive layer") as a temperature sensing body, it has no heater layer. Each sensor device is incorporated in a resin-made casing and connected to an end of a fin plate as a heat transfer body.

According to this embodiment, a sensor element portion 741 of the urea sensor 74 is constructed so as to include the first and second sensor elements. The sensor element portion 741 is immersed in urea aqueous solution upon detection of the concentration and disposed in the vicinity of the U-shaped bottom portion of the cooling water distribution pipe 81 as described above. Respective fin plates 7414, 7415 penetrate a casing 7413 and are exposed to a spacing defined within the storage tank 41.

A circuit portion 742 is connected to a heater layer and a temperature measuring resistive layer (which corresponds to "first temperature sensing body") of the first sensor element 7411 and a temperature measuring resistive layer (which corresponds to "second temperature sensing body") of the second sensor element 7412. While the first temperature measuring resistive layer is heated by supplying electricity to the heater layer, respective resistances $Rn1$, $Rn2$ of the heated first temperature measuring resistive layer and the second temperature measuring resistive layer insulated thermally from the heater layer are detected. The temperature measuring resistive layer has a characteristic such that the resistance changes in proportion to the temperature. The circuit portion 742 conducts calculation of concentration $Dn$ based on the detected $Rn1$ and $Rn2$ as follows. In the meantime, the urea sensor 74 has both a function as "concentration detecting unit" for detecting the concentration of urea and a function of determining the remaining amount of urea aqueous solution.

Figure 3:
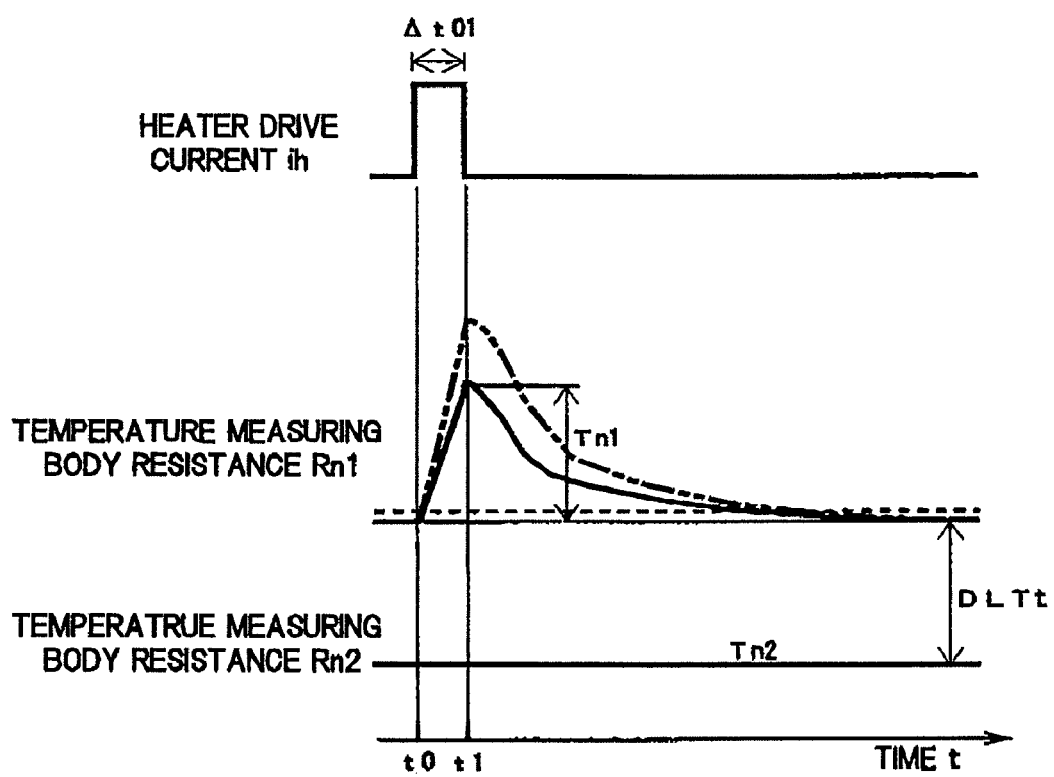
FIG. 3 shows a detection principle of the concentration of the urea sensor.

FIG. 3 shows a detection principle of detecting the concentration.

Heating by the heater layer is carried out by supplying heater drive current $ih$ to the heater layer for a predetermined time interval $\Delta t01$. The circuit portion 742 detects resistances $Rn1$, $Rn2$ of each temperature measuring resistive layer at time $t1$ when supplying of electricity to the heater layer is stopped, and executes calculation of a temperature difference of $\Delta Tmp12$ ($=Tn1-Tn2$) between the temperature measuring resistive layers at that time. This $\Delta Tmp12$ changes according to the heat transfer characteristic with urea aqueous solution used as medium and this heat transfer characteristic changes according to the concentration of urea. Thus, concentration $Dn$ can be calculated by converting the calculated $\Delta Tmp12$. Further, whether or not the quantity of urea aqueous solution remaining in the storage tank 41 is short can be determined based on the calculated $\Delta Tmp12$.

Although according to this embodiment, the first sensor element 7411 is so constructed that the first temperature measuring resistive layer is brought into contact with urea aqueous solution through the fin plate 7414, a measuring chamber for introducing urea aqueous solution in the storage tank 41 may be formed in the sensor element portion 741 so that the first temperature measuring resistive layer is heated by a heater through urea aqueous solution within this measuring chamber. In this case, the first temperature measuring resistive layer and urea aqueous solution will come into direct contact with each other.

Next, the operation of the SCR-C/U 61 will be described with the flow chart.

The operation of the SCR-C/U 61 of this embodiment is substantially performed as follows. That is, the SCR-C/U 61 carries out detection permission determination (FIG. 4: detection permission routine) and only when detection of the concentration is permitted by this determination, the concentration Dn is detected. When the detected Dn is within a predetermined range which is specified as normal area of concentration, it is determined that no specified abnormality concerning urea aqueous solution is generated and an output indicating concentration Dn is delivered. On the other hand, when the detected Dn is not within this range, that concentration Dn per se is outputted and abnormality concerning either remaining amount or concentration of the urea aqueous solution as the above-mentioned specified abnormality is detected. According to this embodiment, while an abnormality concerning the remaining amount of urea aqueous solution (hereinafter referred to as "abnormality in remaining amount") is detected when the Dn is in an area exceeding this range, an abnormality concerning the concentration of urea aqueous solution (hereinafter referred to as "abnormality in concentration") is detected when the Dn is in an area below this range. According to this embodiment, when abnormality in concentration is detected, the validity of the concentration is determined from viewpoints of the temperature equilibrium of urea aqueous solution within the storage tank 41 (FIG. 6: concentration abnormality validity determination routine) and its detection result is treated as a decided result only when it is determined that the result is valid. According to this embodiment, when each abnormality is detected, error counters CNTc, CNTe are incremented by each predetermined value each time when each abnormality is detected, and when the error counters CNTc, CNTe reach predetermined values CNTclim, CNTelim, actually, occurrence of abnormality is determined (FIG. 5: concentration detection/abnormality determination routine). When any of these abnormality determination is executed, the SCR-C/U 61 delivers an output signal indicating stopping of injection of urea aqueous solution to the injection nozzle 43 (FIG. 8: urea aqueous solution injection control routine). Hereinafter, each routine will be described.

Figure 4:
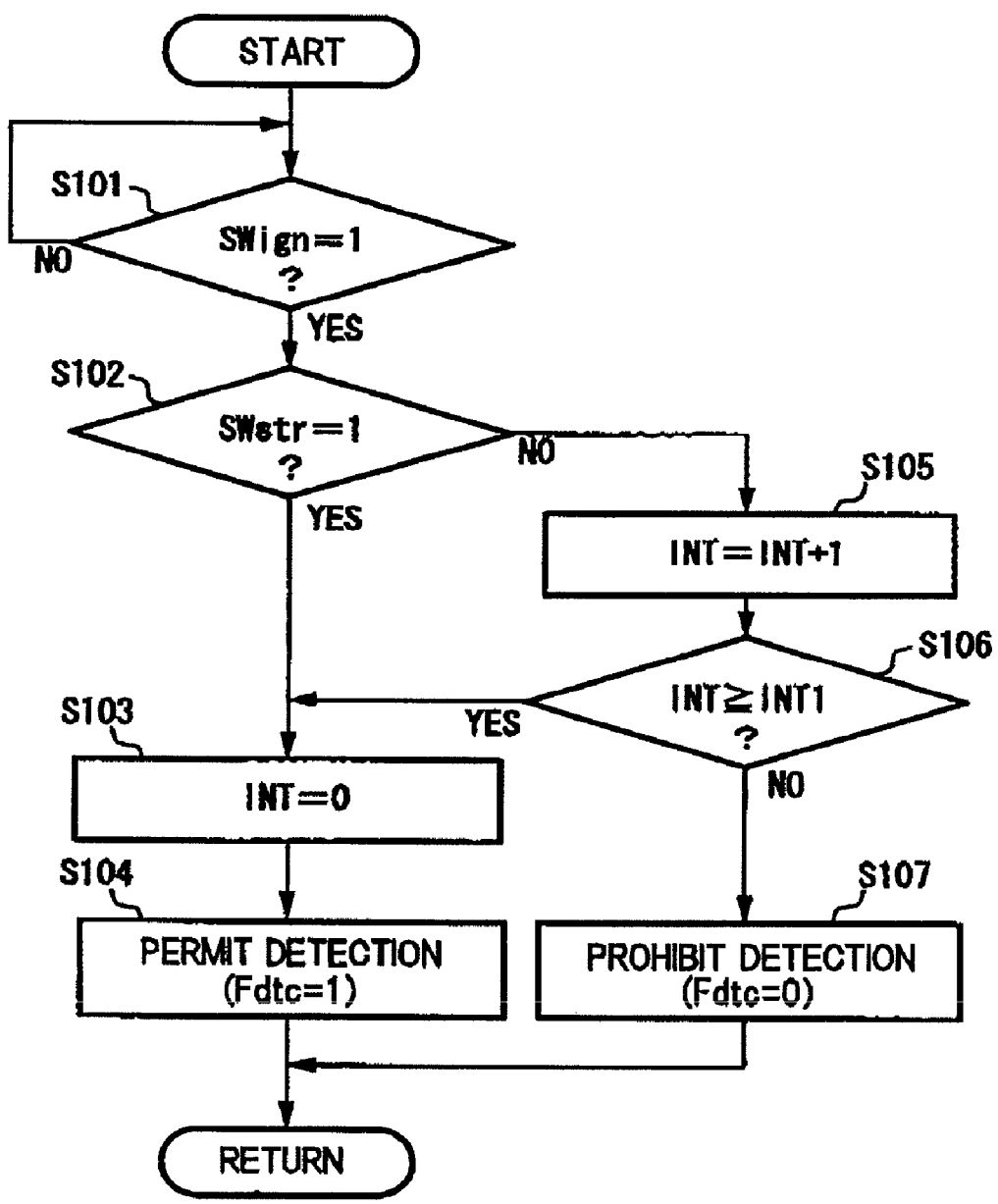
FIG. 4 shows a flow chart of a detection permitted routine.

FIG. 4 is a flow chart of the detection permission routine. This routine is started when the ignition switch is turned ON and after that, it is repeated every predetermined time interval. Detection of the concentration Dn is permitted or prohibited by this routine.

In S101, an ignition switch signal SWign is read, and determination is made as to whether or not SWign is 1. When it is 1, it is determined that the ignition switch is turned ON and the procedure proceeds to S102.

In S102, the start switch signal SWstr is read in, and determination is made as to whether or not the SWstr is 1. When it is 1, it is determined that the start switch is turned ON to start the engine 1. Then, the procedure proceeds to S103, in order to execute permission determination. When it is not 1, the procedure proceeds to S105.

In S103, a detection interval INT is reset to 0.

In S104, a permission determination flag Fdtc is set to 1 and permission determination is executed.

In S105, the detection interval INT is incremented by 1 (INT=INT+1).

In S106, after the increment, whether or not INT has reached a predetermined value INT1 is determined. When the INT is reached INT1, it is determined that a detection interval necessary for detection of the concentration Dn is secured and the procedure proceeds to S103. When the INT does not reach the INT1, it is determined that the necessary detection interval is not secured and the procedure proceeds to S107 in order to execute prohibition determination.

In S107, the permission determination flag Fdtc is set to 0 and prohibition determination is executed.

Figure 5:
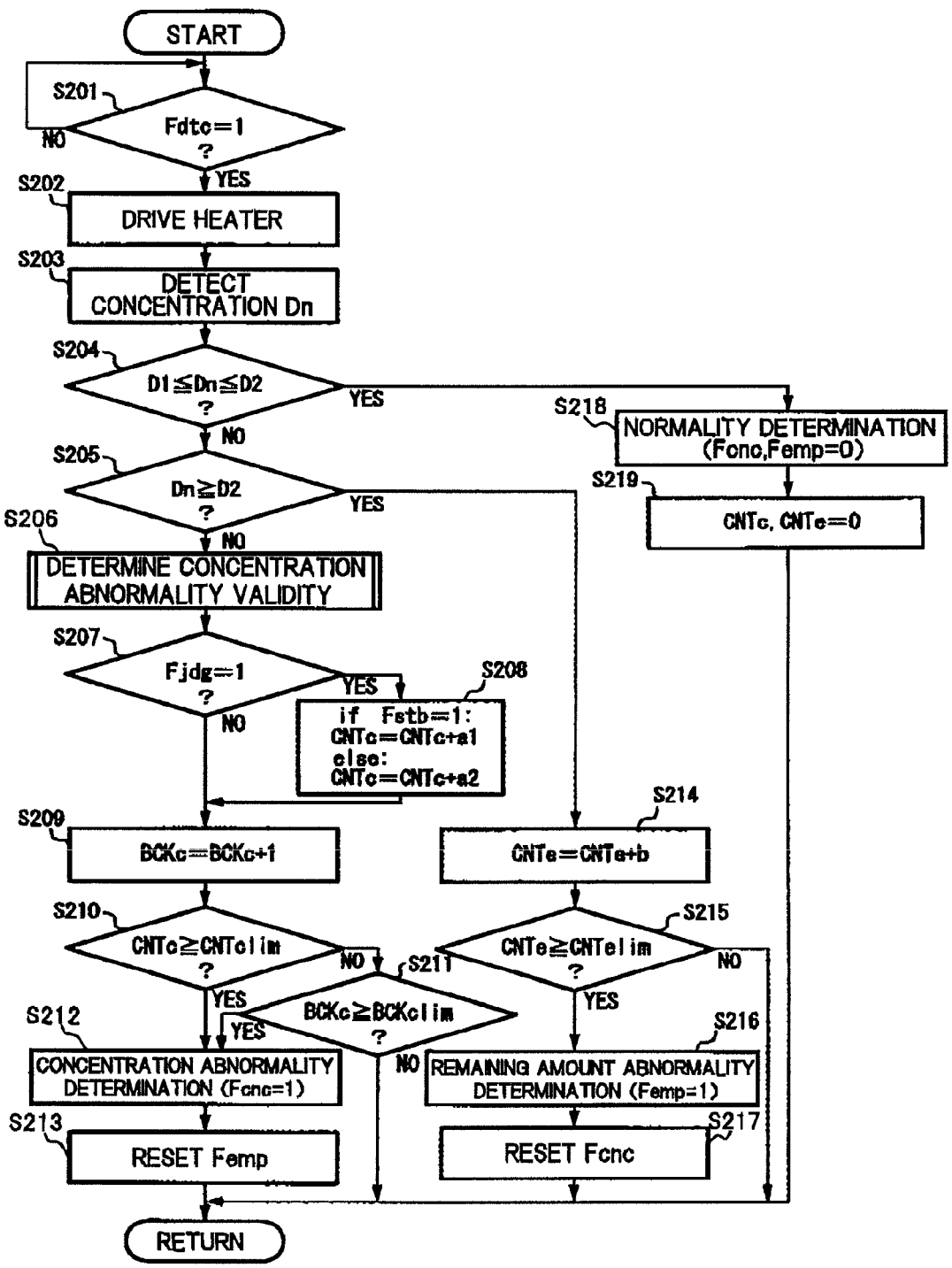
FIG. 5 shows a flow chart of a concentration detection/abnormality determination routine.

FIG. 5 is a flow chart of concentration detection/abnormality determination routine. This routine is carried out when the permission determination flag Fdtc is set to 1 by the aforementioned detection permission routine. The concentration Dn is detected by this routine and at the same time, a specified abnormality concerning urea aqueous solution is detected.

In S201, the permission determination flag Fdtc is read in, and determination is made as to whether or not the read Fdtc is 1. Only when it is 1, the procedure proceeds to S202.

In S202, electricity is supplied to the heater layer of the urea sensor 74, in order to detect the concentration Dn so that the first temperature measuring resistive layer is heated.

In S203, the concentration Dn is detected. The detection of the concentration Dn is carried out by detecting resistance values Rn1, Rn2 of each heated temperature measuring resistive layer, calculating a temperature difference ΔTmp12 between the temperature measuring resistive layers corresponding to a difference between the detected Rn1 and Rn2 and converting the calculated ΔTmp12 into the concentration Dn.

In S204, determination is made as to whether or not the detected Dn is in a predetermined range (which corresponds to "normal range") in which a first value D1 and a second value D2 which is larger than this first value serve as a lower limit and an upper limit, respectively. When it is within this range, the procedure proceeds to S218, or otherwise the procedure proceeds to S205.

In S205, whether or not the concentration Dn is equal to or higher than a predetermined second value D2 is determined. When it is equal to or higher than D2, the procedure proceeds to S214 and when it is lower than D2, the procedure proceeds to S206. This D2 is set to an intermediate value between an output Dn obtained when the urea sensor 74 is in urea aqueous solution and an output Dn obtained when the urea sensor 74 is in the air. That is, when the concentration Dn is equal to or higher than D2, it is determined that this Dn is over the normal area and such an abnormality in remaining amount that the remaining amount is short (or the storage tank 41 is empty) is detected. On the other hand, when the concentration Dn is smaller than D2, it is determined that this Dn is lower than the normal area, so that such an abnormality in concentration that other type aqueous solution (in this case, water is included in concept) than urea aqueous solution of a specified concentration is stored in the storage tank 41 is detected.

In S206, validity of detection of abnormality in concentration is determined. This determination is executed according to the concentration abnormality validity determination routine shown in FIG. 6 from the viewpoint of temperature equilibrium of urea aqueous solution as described above. When it is determined that the detection of abnormality in concentration is valid by this routine, the validity determination flag Fjdg is set to 1 and when it is determined that it is not valid, the validity determination flag Fjdg is set to 0.

In S207, whether or not the validity determination flag Fjdg is 1 is determined. When it is 1, it is determined that the detection of abnormality in concentration is valid, and the procedure proceeds to S208, or otherwise the procedure proceeds to S209.

In S208, points a1, a2 which are values corresponding to a vehicle state flag Fstb are added to a concentration error counter CNTc (which corresponds to the "first counter"). The vehicle state flag Fstb is set to 0 or 1 according to a vehicle state determination routine shown in FIG. 7. In this routine, the magnitude of swing of urea aqueous solution within the storage tank 41 is determined from the viewpoint of an influence applied by vibration of the engine 1. When Fstb is 1, a relatively large value a1 (for example, 3) is added to the CNTc. When Fstb is 0, a smaller value a2 (for example, 1) than a1 is added to CNTc. Under the circumstances that the vibration of the engine 1 is small and the swing of urea aqueous solution is small, dispersion of the heat transfer characteristic by agitation of urea aqueous solution is also small. Thus, the high level of reliability due to the obtained concentration Dn can be well reflected on the abnormality determination.

In S209, 1 is added to a backup error counter BCKc (which corresponds to the "second counter"). Unlike the concentration error counter CNTc, the backup error counter BCKc is incremented by 1 each time when a concentration lower than the normal range is detected regardless of the validity determination flag Fjdg.

In S210, whether or not the CNTc has reached a predetermined value CNTclim (for example, 10) after count-up is determined. When the CNTc reaches the CNTclim, the procedure proceeds to S212 and when it does not reach, the procedure proceeds to S211.

In S211, whether or not the BCKc after count-up has reached a predetermined value BCKclim (larger than the CNTclim, for example, 100) is determined. When the BCKclim is reached, the procedure proceeds to S212 and when it does not reach, this routine is returned.

In S212, concentration abnormality determination that other kind of aqueous solution is stored in the storage tank 41 is made and 1 is set to the concentration abnormality determination flag Fcnc. In the meantime, according to this embodiment, when a lower concentration than the first value D1 is detected (S204, S205), just one concentration abnormality determination is upheld. However, when the storage tank 41 is filled with other kind of aqueous solution or when urea aqueous solution is diluted excessively, it is permissible to set respective concentration abnormality determination flags different from each other, and a comparison of the concentration Dn with a third value D3 which is larger than D1 is conducted to distinguish abnormalities of individual cases.

In S213, the remaining amount abnormality determination flag Femp is set to 0 and the remaining amount error counter CNTe is reset to 0.

In S214, a predetermined point b (for example, 1) is added to the remaining amount error counter CNTe.

In S215, whether or not the CNTe after count-up has reached a predetermined value CNTelim is determined. When the CNTe reaches the CNTelim, the procedure proceeds to S216 and when it does not reach, this routine is returned.

In S216, remaining amount abnormality determination that the quantity of urea aqueous solution left in the storage tank 41 does not reach a predetermined quantity (for example, the storage tank 41 is empty) is made and the remaining amount abnormality determination flag Femp is set to 1.

In S217, the concentration abnormality determination flag Fcnc is set to 0 and the concentration error counter CNTc and the backup error counter BCKc is reset to 0.

In S218, normality determination is made and respective abnormality determination flags Fcnc, Femp are set to 0.

In S219, error counters CNTc, CNTe (and backup counter BCKc) are reset to 0.

Figure 6:
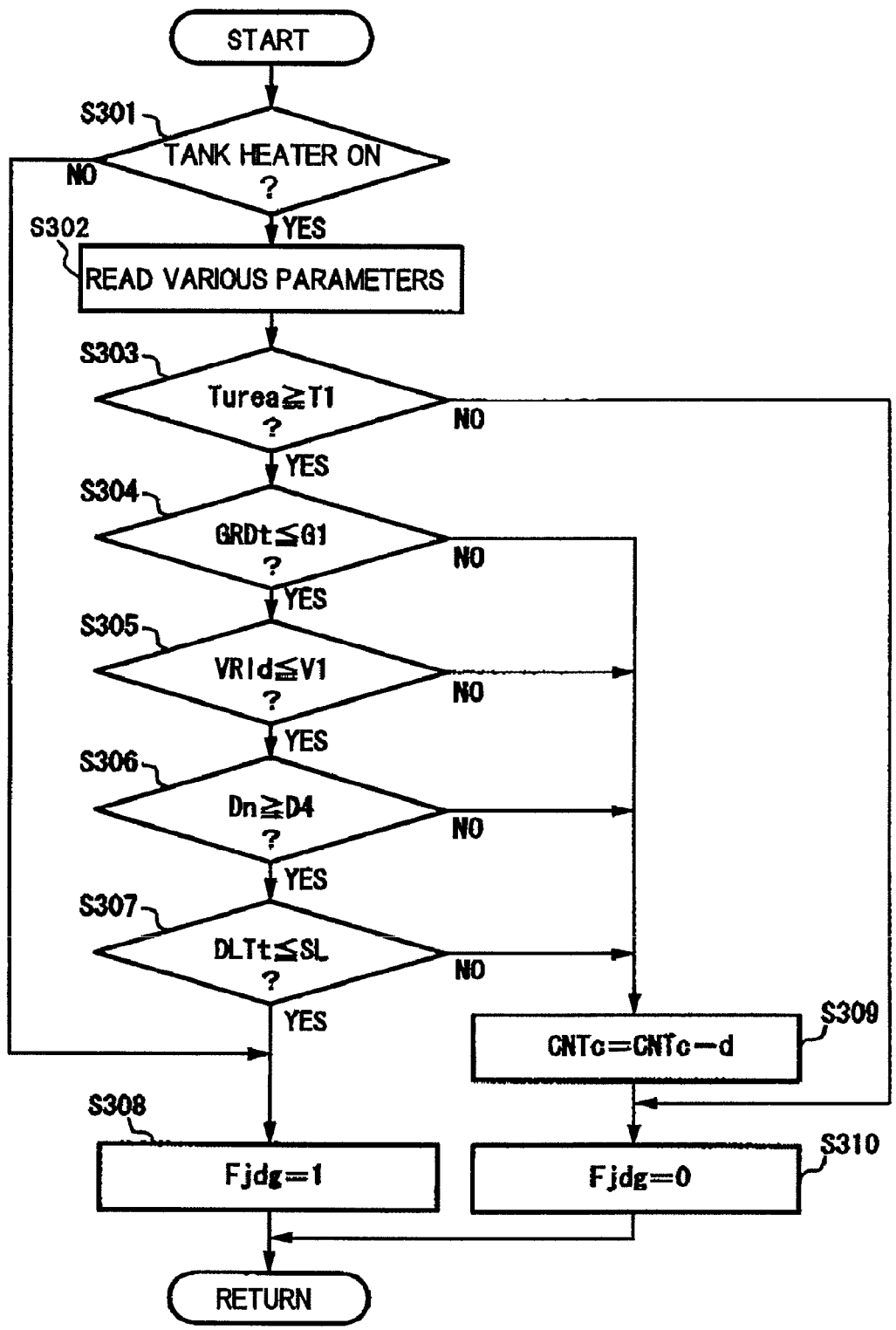
FIG. 6 shows a sub-routine of concentration abnormality validity determination processing of the above routine.

FIG. 6 is a flow chart indicating a concentration abnormality validity determination routine. This routine is constituted as a subroutine to be executed in S206 of the aforementioned concentration detection/abnormality determination routine. The validity of detection of abnormality in concentration is determined by this routine.

In S301, whether or not the tank heater is operated, that is, whether or not cooling water flows through the cooling water distribution pipe 81 is determined. When it is operated, the procedure proceeds to S302 and when it is stopped, the procedure proceeds to S308. This determination is made based on the degree of opening of the flow rate control valve for controlling flow-in of cooling water into the cooling water distribution pipe 81. When the tank heater is stopped, it is contemplated that no strong convection of urea aqueous solution which seriously affects detection of the concentration is generated in the storage tank 41 and that the temperature of urea aqueous solution is substantially in an equilibrium state.

In S302, as basic information for validity determination, a temperature Turea of urea aqueous solution and resistance values Rn1, Rn2 of the temperature measuring resistive layers of the respective sensor elements 7411, 7412 are read in.

In S303, determination is made as to whether or not the read Turea is equal to or higher than a predetermined value T1. When it is equal to or higher than T1, the procedure proceeds to S304 and when it is less than T1, the procedure proceeds to S310. This T1 is set to a temperature (−5° C.) under which urea is frozen. When urea aqueous solution is frozen, it can be contemplated that detection of the concentration based on heat transfer characteristic lacks accuracy and detection of abnormality in concentration also lacks validity.

In S304, whether or not temperature change rate GRDt of urea aqueous solution is equal to or less than a predetermined value G1 is determined. When it is equal to or less than G1, the procedure proceeds to S305 and when it is larger than G1, the procedure proceeds to S309. This is because when GRDt is small, it can be comprehended that a difference in temperature between cooling water and urea aqueous solution as heat medium is small and accordingly, no strong convection which is problematic is generated. In this embodiment, the GRDt is calculated as a difference ($=Turea-Turea_{n-1}$) between temperatures Turea and $Turea_{n-1}$ at the times of current measurement and previous measurement, based on the Turea read in every time of the measurement.

In S305, whether or not the amount of dispersion VRId of the concentration Dn is equal to or less than a value V1 is determined. When it is equal to or less than V1, the procedure proceeds to S306 and when it is larger than V1, the procedure proceeds to S309. This is because when VRId is small, the concentration Dn is detected stably and the reliability of a detected Dn is high. In this embodiment, the VRId is calculated as an absolute value ($=|Dn-Dn_{n-1}|$) of a difference between concentrations Dn and $Dn_{n-1}$ at the time of current measurement and previous measurement, based on the Dn to be read in every time of the measurement.

In S306, whether or not the concentration Dn is equal to or higher than a predetermined value D4 is determined. When it is equal to or higher than D4, the procedure proceeds to S307 and when it is less than D4, the procedure proceeds to S309. This D4 is set to a value of less than 0, for example, as a lower limit of a range which the concentration Dn can adopt.

In S307, whether or not an initial temperature difference DLTt of each temperature measuring resistive layer is equal to or less than a predetermined value SL is determined. When it is equal to or less than the SL, the procedure proceeds to S308 and when it is higher than the SL, the procedure proceeds to S309. This is because when the DLTt is small, unevenness in temperature between the respective sensor elements 7411 and 7412 is small so that it can be determined that no strong convection is generated. The DLTt is calculated as a temperature difference DLTt (FIG. 3) between the respective temperature measuring resistive layers which appears just before the heater layer is driven.

In S308, the validity determination flag Fjdg is set to 1 indicating that the detection of abnormality in concentration is valid.

In S309, a predetermined value d is subtracted from the concentration error counter CNTc. In the meantime, this d may be set at each determination of S304 through S307 and values d1 through d4 corresponding to a determination in which a negative result is obtained may be subtracted from the CNTc.

In S310, the validity determination flag Fjdg is set to 0.

Figure 7:
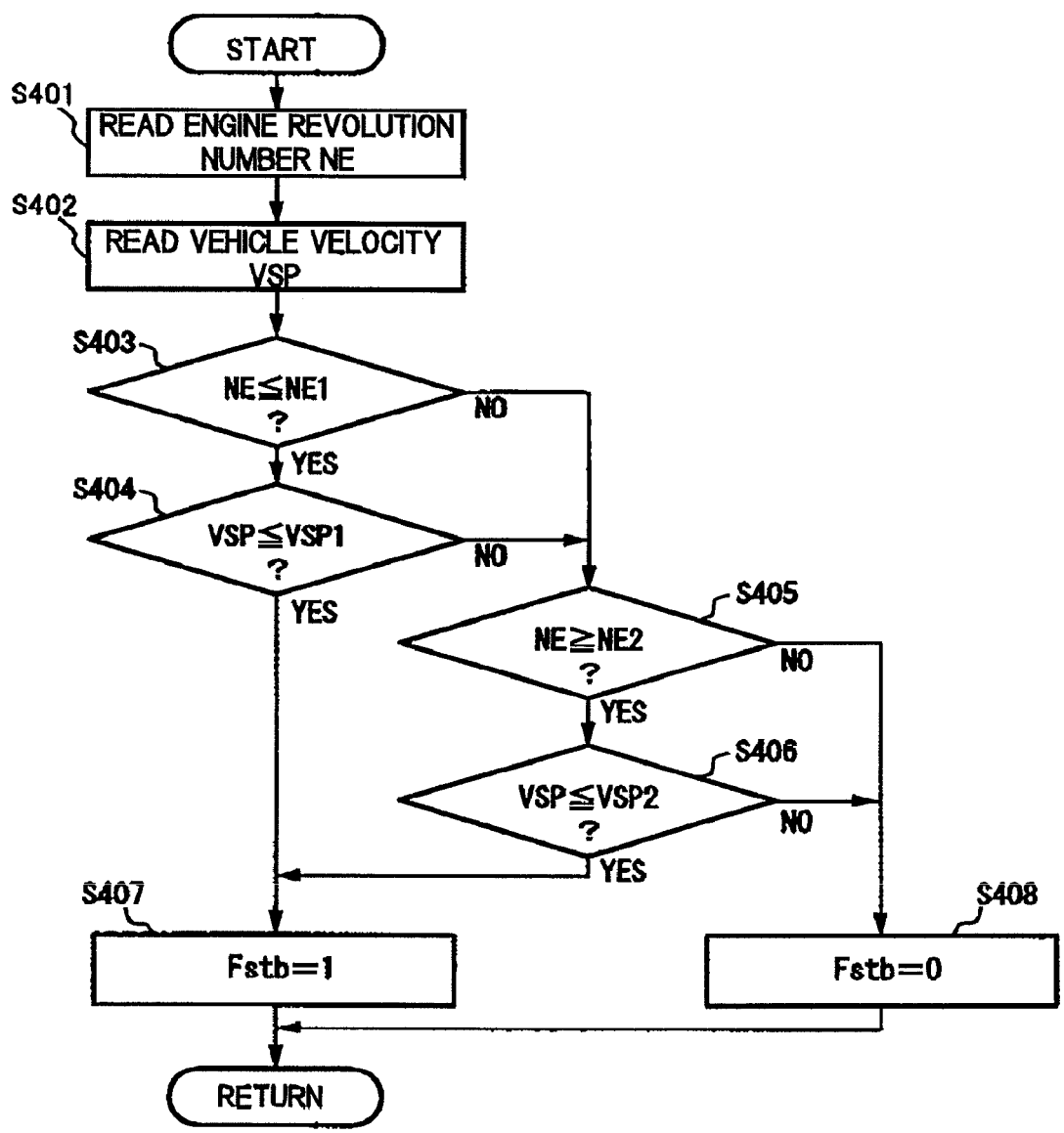
FIG. 7 shows a flow chart of a vehicle state determination routine.

FIG. 7 is a flow chart indicating a vehicle state determination routine. This routine is repeated every predetermined time interval.

In S401, an engine revolution number NE is read in.

In S402, a vehicle velocity VSP is read in.

In S403, whether or not a read NE is equal to or less than a predetermined value NE1 which is smaller than an idle revolution number (=400 through 600 rpm: a resonance point exists in an idle operation range) is determined. When it is equal to or less than NE1, the procedure proceeds to S404 and when it is higher than NE1, the procedure proceeds to S405.

In S404, whether or not the read VSP is equal to or less than a predetermined value VSP1 indicating a stopped condition is determined. When it is equal to or less than the VSP1, the procedure proceeds to S407 and when it is higher than the VSP1, the procedure proceeds to S405.

In S405, whether or not the read NE is equal to or higher than the predetermined value NE2 which is larger than the idle revolution number is determined. When it is equal to or higher than the NE2, the procedure proceeds to S406 and when it is lower than the NE2, the procedure proceeds to S408.

In S406, whether or not the read VSP is equal to or less than the predetermined value VSP2 which is larger than the VSP1 is determined. If it is equal to or less than the VSP2, the procedure proceeds to S407 and if it is higher than the VSP2, the procedure proceeds to S408.

In S407, because it is contemplated that the swing of urea aqueous solution due to vibration of the engine 1 as disturbance is small, the vehicle state flag Fstb is set to 1.

In S408, the vehicle state flag Fstb is set to 0.

Figure 8:
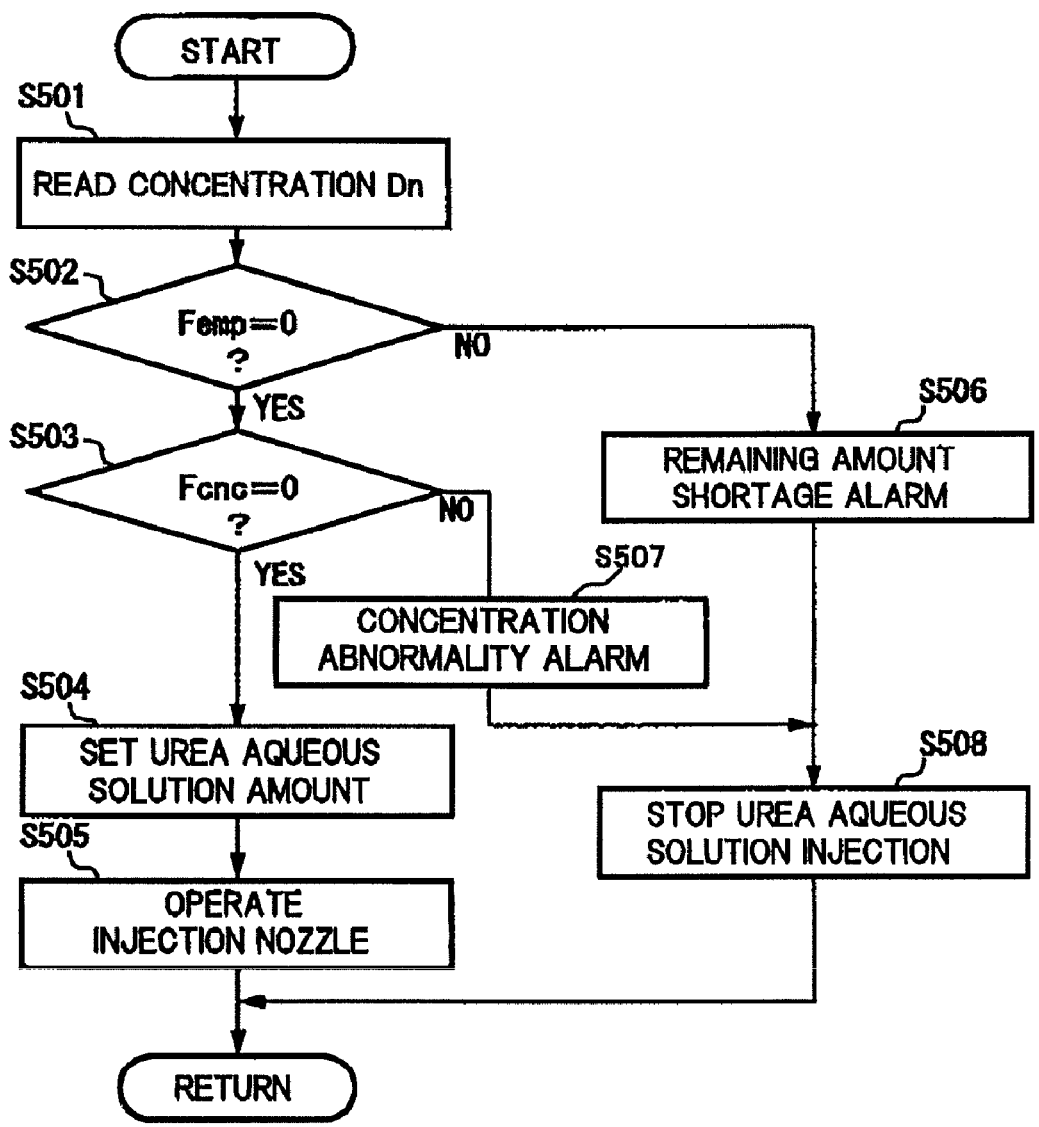
FIG. 8 shows a flow chart of a urea aqueous solution injection control routine.

Next, an example of urea aqueous solution injection control adopting the concentration Dn will be described with the flow chart of FIG. 8. This routine is executed each predetermined time.

In S501, the concentration Dn is read in.

In S502, determination is made as to whether or not the remaining amount abnormality determination flag Femp is 0. When it is 0, the procedure proceeds to S503 and when it is not 0, it is determined that the remaining amount abnormality determination is upheld and the procedure proceeds to S506.

In S503, determination is made as to whether or not the concentration abnormality determination flag Fcon is 0. When it is 0, the procedure proceeds to S504 and when it is not 0, is determined that the concentration abnormality determination is made and the procedure proceeds to S507.

In S504, an injection amount of urea aqueous solution is set. Setting of the injection amount of urea aqueous solution is carried out by calculating the basic injection amount corresponding to the fuel injection amount of the engine 1 and an output of the NOx sensor 73, and then correcting the calculated basic injection amount according to the concentration Dn. When the concentration Dn is large and the urea content per unit injection amount is large, the basic injection amount is reduced by correction. On the other hand, when the concentration Dn is small and the urea content per unit injection amount is small, the basic injection amount is increased by correction.

In S505, an operation signal corresponding to a set urea aqueous solution injection amount is outputted to the injection nozzle 43.

In S506, the remaining amount alarm lamp 92 provided on the control panel of a driver's seat is operated to make the driver recognize that the remaining amount of urea aqueous solution is short.

In S507, the concentration alarm lamp 91 provided on the control panel is operated for permitting the driver to recognize that other kind of aqueous solution is stored in the storage tank 41.

In S508, injection of urea aqueous solution is stopped. This is because when water or the like is stored in the storage tank 41 instead of urea aqueous solution as well as when the remaining amount of urea aqueous solution is short, an amount of urea aqueous solution necessary for addition of ammonia cannot be injected. Although in this embodiment, injection of urea aqueous solution is stopped when each abnormality determination is upheld, it is permissible to output a signal for reducing the emission amount of NOx per se from the engine 1 or controlling the output of the engine 1 to the engine C/U 51 in parallel to or instead of this control. As the former control, the amount of exhaust gas returned through the EGR tube 35 is increased with respect to normal time where other than when abnormality is determined. Further, as the latter control, the output characteristic of the engine 1 to accelerator operation is made different from the normal time, for example, fuel injection amount with respect to an accelerator opening degree is reduced as compared to the normal time.

In accordance with this embodiment, the following effects can be obtained.

Figure 9:
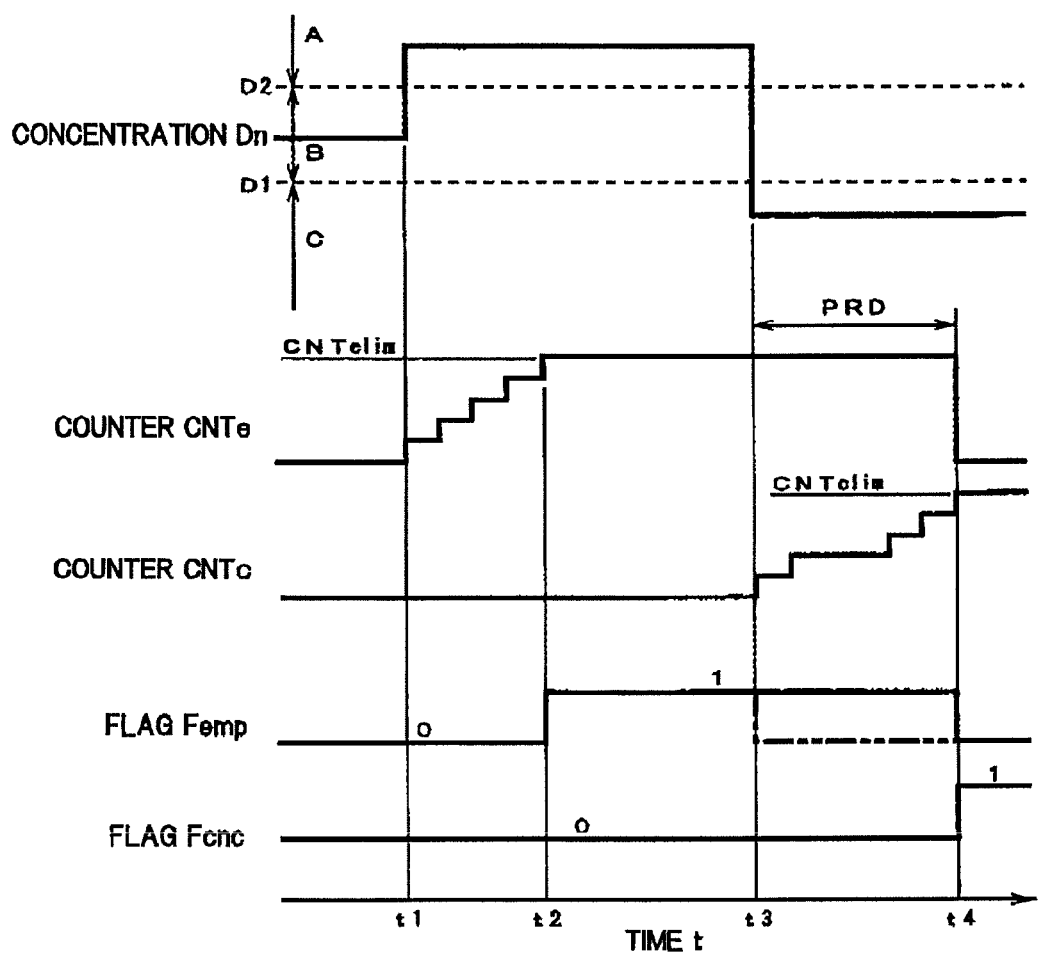
FIG. 9 shows a time chart showing the operation of an SCR-C/U.

FIG. 9 is a time chart showing the operation of the SCR-C/U 61, indicating activities of the respective error counters CNTc, CNTe and respective abnormality determination flags Fcnc, Femp when the concentration Dn is shifted from an area A higher than a predetermined range B to an area C lower than this range B (time t3) because water or the like is supplied carelessly or intentionally after the remaining amount abnormality determination (which corresponds to "second abnormality determination") is made (time t2).

According to this embodiment, in such a case, after an abnormal concentration Dn in the area C is detected (time t3), the remaining amount abnormality determination is maintained for a period PRD until the concentration error counter CNTc is increased and reaches a predetermined value CNTclim, and the concentration abnormality determination (which corresponds to "first abnormality determination") is made (CNTe=CNTelim, Femp=1: S210 in FIG. 5). Thus, such an undesired situation can be avoided that, in spite of the fact that reduction of NOx is not carried out favorably, the engine 1 is operated as normally and water or the like is injected because the concentration error counter CNTc has not reached a predetermined value CNTclim, and discharge of non-purified NOx into the atmosphere resultantly occur.

Particularly, according to this embodiment, when concentration abnormality is detected, its validity is determined from the viewpoint of temperature equilibrium according to the flow chart shown in FIG. 6 and detection of concentration abnormality is treated as having been already done only when the validity is determined (time t3 to t4). Thus, erroneous detection of concentration abnormality due to an influence of convection can be avoided preventing such a malfunction as unexpected stopping of injection of urea aqueous solution due to this erroneous detection. In determination of the validity according to this embodiment, after the temperature of urea aqueous solution reaches an equilibrium state by heating by the tank heater, it is determined that detection of concentration abnormality is valid because conditions of S303 to S307 of the flow chart shown in FIG. 6 are established as a rule. Further, even before the temperature reaches an equilibrium state, only when these conditions are established, it is determined that detection of concentration abnormality is valid because convection is weak so that a sufficient reliability is compensated for the detection result.

As described above, the error counters CNTc, CNTe which are incremented by each predetermined values a1, a2 and b every time when abnormality in concentration or remaining amount is detected are adopted to secure accuracy of abnormality determination. However, just a frequency may be adopted instead of the error counter. In such case, the determination of abnormality may be made when a predetermined ratio of concentrations Dn, which is detected over predetermined frequencies, are kept within the area A or C (for example, when the concentrations Dn in that area are detected continuously over predetermined frequencies), after the concentration Dn is moved from an area out of respective areas A, C to that area A, C, Although ammonia is generated by hydrolytic degradation of urea, FIG. 1 does not indicate any catalyst for this hydrolytic degradation clearly. To enhance the efficiency of hydrolytic degradation, it is permissible to arrange the catalyst for hydrolytic degradation at a position upstream of the NOx purifying catalyst 33.

As the "aqueous solution" of the present invention, aqueous solution of a reducing agent such as ammonia water may be adopted as well as urea aqueous solution as aqueous solution of the above adopted precursor.

The present invention can be applied to a diesel engine other than that of direct fuel-injection type (for example, an auxiliary chamber type diesel engine) and a gasoline engine.

Although the preferred embodiment of the present invention has been described, the scope of the invention is not restricted to any particular one but is judged according to an applied provision as well as the description of the scope of claims.

We claim:

1. An engine exhaust gas purifying apparatus for reducing NOx in an exhaust gas from an engine by adding a reducing agent for NOx to the exhaust gas, comprising:
a storage tank for storing the reducing agent for NOx or a precursor thereof to be added to the exhaust gas in a state of aqueous solution;
a concentration detecting unit for detecting a concentration of the reducing agent or the precursor contained in the aqueous solution stored in the storage tank, the concentration detecting unit including: a first temperature sensing body having a property that an electric characteristic value changes according to a temperature and arranged to be in direct or indirect contact with the aqueous solution; and a heater thermally connected to the first temperature sensing body, the concentration detecting unit driving the heater and outputting an electric characteristic value of the first temperature sensing body heated by the heater as the concentration of the reducing agent or the precursor;
a control unit which is connected to the concentration detecting unit to detect a predetermined abnormality concerning the aqueous solution based on the concentration detected by the concentration detecting unit, the control unit including: a state determining portion for determining whether or not the temperature of the aqueous solution is substantially in an equilibrium state; and an abnormality detecting portion which, when the detected concentration is in an abnormal area other than a predetermined area specified to be a normal area of concentration, detects the predetermined abnormality based on a concentration detected at a time period of temperature equilibrium during which it is determined that the temperature of the aqueous solution is in the equilibrium state; and
a tank heater provided on the storage tank, wherein the control unit detects the predetermined abnormality with the abnormality detecting portion according to a result of the determination by the state determining portion at the time of heating by the tank heater.

2. The engine exhaust gas purifying apparatus according to claim 1, wherein the tank heater includes a cooling water distribution pipe through which cooling water for the engine is distributed so that the aqueous solution is heated by heat exchange with the engine cooling water.

3. The engine exhaust gas purifying apparatus according to claim 1, wherein the state determining portion determines that, when a rate of temperature rise of the aqueous solution is equal to or less than a predetermined value, the temperature of the aqueous solution is in the equilibrium state.

4. The engine exhaust gas purifying apparatus according to claim 1, wherein the state determining portion determines that, when an absolute value of a difference between a current value and a previous value of the concentration detected by the concentration detecting unit is equal to or less than a predetermined value, the temperature of the aqueous solution is in the equilibrium state.

5. The engine exhaust gas purifying apparatus according to claim 1, wherein the state determining portion determines that, when the concentration detected by the concentration detecting unit is in a predetermined range in which a first value specifying a boundary between the normal area and the abnormal area and a second value in the abnormal area different from the first value define upper and lower limits, respectively, the temperature of the aqueous solution is in the equilibrium state.

6. The engine exhaust gas purifying apparatus according to claim 1, wherein the concentration detecting unit further includes a second temperature sensing body which is thermally insulated from the heater and arranged to be in contact with the aqueous solution, and
the state determining portion determines that, when a difference between the electric characteristic values of the first and second temperature sensing bodies before the heater is driven is equal to or less than a predetermined value, the temperature of the aqueous solution is in the equilibrium state.

7. The engine exhaust gas purifying apparatus according to claim 1, further comprising an adding unit which is arranged in an engine exhaust gas passage for supplying aqueous solution stored in the storage tank into the exhaust gas passage to add the reducing agent into the exhaust gas,
wherein the control unit controls an amount of the reducing agent added by the adding unit based on the concentration detected by the concentration detecting unit.

8. The engine exhaust gas purifying apparatus according to claim 1, wherein the control unit further includes a first abnormality determining portion which is provided with a first counter that is incremented by a predetermined value every time when the abnormality is detected by the abnormality detecting portion and which upholds an actual abnormality determination when the first counter reaches a first abnormality determination value.

9. The engine exhaust gas purifying apparatus according to claim 8, further comprising a revolution number sensor for detecting an engine revolution number,
wherein the first abnormality determining portion differentiates the predetermined value to be increased every time when the abnormality is detected between when a detected engine revolution number is in a predetermined revolution number area including an engine resonance point and otherwise.

10. The engine exhaust gas purifying apparatus according to claim 8, wherein the control unit further comprises a second abnormality determining portion which is provided with a second counter that is incremented by a predetermined value every time when the concentration in the abnormal area is detected by the concentration detecting unit and which, when the second counter reaches a second abnormality determination value larger than the first abnormality determination value, upholds abnormality determination in preference to the first abnormality determining portion.

11. The engine exhaust gas purifying apparatus according to claim 8, wherein the first abnormality determining portion decrements the first counter by a predetermined value at the time of non-detection other than when the predetermined abnormality is detected.

12. The engine exhaust gas purifying apparatus according to claim 8, wherein the abnormality detecting portion, when the concentration detected by the concentration detecting unit is in a first area in the abnormal area, detects a first abnormality while when the concentration detected by the concentration detecting unit is in a second area different from the first area in the abnormality area, detects a second abnormality, and
the first abnormality determining portion upholds a first abnormality determination based on the value of the first counter in association with detection of the first abnormality and upholds a second abnormality determination in association with detection of the second abnormality, and after making of determination of the second abnormality, when the first abnormality is detected because the detected concentration is changed from the second area directly to the first area, maintains upholding of the second abnormality determination for a predetermined period from the detection of the first abnormality.

13. The engine exhaust gas purifying apparatus according to claim 12, further comprising an adding unit which is arranged in an engine exhaust gas passage for supplying aqueous solution stored in the storage tank into the exhaust gas passage to add the reducing agent to the exhaust gas,
wherein the control unit, when the first or second abnormality determination is upheld, stops addition of the reducing agent by the adding unit.

14. The engine exhaust gas purifying apparatus according to claim 12, further comprising an warning unit for permitting an operator to recognize that the abnormality is generated,
wherein the control unit, when the first or second abnormality determination is upheld, operates the warning unit for permitting the operator to recognize that the abnormality is generated.

15. An engine comprising:
an engine main body which defines therein a combustion chamber;
a reducing catalyst for NOx arranged in an engine exhaust gas passage arranged to run from the combustion chamber;
the exhaust gas purifying apparatus according to claim 1; and
an adding unit which is arranged in the exhaust gas passage in a position upstream of the reducing catalyst and supplies aqueous solution stored in the storage tank into the exhaust gas passage to add the reducing agent into the exhaust gas from the engine.

16. The engine according to claim 15, wherein the control unit, when the predetermined abnormality is detected by the abnormality detecting portion, stops addition of the reducing agent by the adding unit.

17. The engine according to claim 15, wherein the control unit controls an amount of the reducing agent added by the adding unit based on the concentration detected by the concentration detecting unit.

18. An engine exhaust gas purifying apparatus for reducing NOx in an exhaust gas from an engine by adding a reducing agent for NOx to the exhaust gas, comprising:
a storage tank for storing the reducing agent for NOx to be added to the exhaust gas or a precursor thereof in a state of aqueous solution;
concentration detecting means for detecting concentration of the reducing agent or the precursor contained in the aqueous solution stored in the storage tank, the concentration detecting means including: a first temperature sensing body having a property that an electric characteristic value changes according to a temperature and arranged to be in direct or indirect contact with the aqueous solution; and a heater for heating the first temperature sensing body, the concentration detecting means driving the heater and outputting the electric characteristic value of the first temperature sensing body heated by the heater as the concentration of the reducing agent or the precursor;
abnormality detecting means for detecting a predetermined abnormality concerning the aqueous solution when the concentration detected by the concentration detecting means is in an abnormal area other than a predetermined area specified as a normal area of concentration;
a tank heater provided in the storage tank; and
state-determining means for determining whether or not a temperature of the aqueous solution is substantially in an equilibrium state,
wherein the abnormality detecting means detects, at the time of heating by the tank heater, the predetermined abnormality based on the concentration detected at a time period of temperature equilibrium during which it is determined that the temperature of the aqueous solution is in the equilibrium state by the state determining means.

19. An engine exhaust gas purifying apparatus for reducing NOx in an exhaust gas from an engine by adding a reducing agent for NOx to the exhaust gas, comprising:
a storage tank for storing the reducing agent for NOx to be added into the exhaust gas or a precursor thereof in a state of aqueous solution;
concentration detecting means for detecting concentration of the reducing agent or the precursor contained in the aqueous solution stored in the storage tank, the concentration detecting means including: a first temperature sensing body having a property that an electric characteristic value changes in accordance with a temperature and arranged to be in direct or indirect contact with the aqueous solution; a heater for heating the first temperature sensing body; and a second temperature sensing body which is thermally insulated from the heater and arranged to be in contact with the aqueous solution, the concentration detecting means driving the heater and calculating the concentration of the reducing agent or the precursor based on the electric characteristic value of the first temperature sensing body heated by the heater and the electric characteristic value of the second temperature sensing body;

abnormality detecting means for detecting a predetermined abnormality concerning the aqueous solution when the concentration detected by the concentration detecting means is in an abnormal area other than a predetermined area specified as a normal area of concentration;

abnormality determining means for, after the predetermined abnormality is detected by the abnormality detecting means, upholding an actual abnormality determination when a predetermined confirmation condition is established;

a tank heater provided in the storage tank; and permission determining means for determining whether a permission condition concerning detection of the abnormality is satisfied or not based on a difference between the electric characteristic values of the first and second temperature sensing bodies before the heater is driven or an amount of change in the electric characteristic value of the first or second temperature sensing body per concentration detection cycle, wherein the abnormality detecting means detects, at the time of heating by the tank heater, the predetermined abnormality based on a concentration detected at the time of detection permission when detection of the abnormality is permitted by the permission determining means, and when the detected concentration is in a first area in the abnormal area, detects a first abnormality and when the detected abnormality is in a second area different from the first area within the abnormal area, detects a second abnormality, and the abnormality determining means upholds a first abnormality determination in association with detection of the first abnormality and upholds a second abnormality determination in association with detection of the second abnormality, and after making determination of the second abnormality, when the first abnormality is detected because the detected concentration is changed from the second area directly to the first area, maintains upholding of the second abnormality determination for a predetermined period from the detection of the first abnormality.

* * * * *